United States Patent
Acedo et al.

(10) Patent No.: US 7,882,060 B2
(45) Date of Patent: Feb. 1, 2011

(54) REMOTE SPACE EFFICIENT REPOSITORY

(75) Inventors: Mario F. Acedo, Tucson, AZ (US);
Ezequiel Cervantes, Tucson, AZ (US);
Paul A. Jennas, II, Tucson, AZ (US);
Jason L. Peipelman, Vail, AZ (US);
Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 12/023,814

(22) Filed: Jan. 31, 2008

(65) Prior Publication Data

US 2009/0198710 A1 Aug. 6, 2009

(51) Int. Cl.
*G06F 7/00* (2006.01)
(52) U.S. Cl. ...................................... 707/609
(58) Field of Classification Search .................. 707/609
See application file for complete search history.

(56) References Cited

U.S. PATENT DOCUMENTS

2004/0215919 A1* 10/2004 Emmes ........................ 711/208
2007/0103984 A1* 5/2007 Kavuri et al. .......... 365/185.17
2007/0239944 A1* 10/2007 Rupanagunta et al. ...... 711/147

OTHER PUBLICATIONS

Sudharshan S. Vazhkudai, et al., FreeLoader: Scavenging Desktop Storage Resources for Scientific Data, Proceedings of the 2005 ACM/IEEE SC/05 Conference (SC05), copyright 2005.
Sudharshan S. Vazhkudai, Constructing Collaborative Desktop Storage Caches for Large Scientific Datasets, ACM Transactions on Storage, vol. 2, No. 3, Aug. 2006.
Xiaosong Ma et al, Coupling Prefix Caching and Collective Downloads for Remote Dataset Access, 2006, pp. 229-238.
Ladjel Bellatreche, et al., On Efficient Storage Space Distribution Among Materialized Views and Indices in Data Warehousing Environments, 2000, pp. 397-404.
Ron Kownacki et al, Portable and Efficient Dynamic Storage Management in ADA, 1987, pp. 190-198.

* cited by examiner

*Primary Examiner*—Charles Rones
*Assistant Examiner*—Fazlul Quader
(74) *Attorney, Agent, or Firm*—Dale F. Regelman; Quarles & Brady LLP

(57) ABSTRACT

A method for storing data includes establishing a space efficient storage system including a virtual repository, a staging repository and a remote repository. The virtual repository includes a first pointer to the staging repository, and the staging repository includes a second pointer to the remote repository. The method further includes receiving data at the virtual repository, storing the received data in the staging repository based on the first pointer, and transferring the stored data to the remote repository based on the second pointer.

18 Claims, 2 Drawing Sheets

100

100

200

REMOTE SPACE EFFICIENT REPOSITORY

FIELD OF INVENTION

The present invention generally relates to storage repositories. More specifically, the invention relates to space efficient repositories.

BACKGROUND OF THE INVENTION

Data is stored on systems, and these systems require space as well as resources to manage the storage. Historically, much data was stored on local devices, such as tape and/or hard drives and removable media. As the need for data storage increases, remote data storage increases its appeal. Remote data storage reduces local space requirements and can help improve service with dedicated resources. Remote data storage further lends itself well to a customer/vendor relationship, wherein the vendor supplies the data storage to the customer.

As customer storage becomes more and more focused on archival storage and the necessity to reduce storage floor space/energy usage, off-site (leased) storage becomes more and more of a desirable option. However, customers still (and will always) have a requirement to have existing storage on site for performance and security reasons. Unfortunately any solution to have both on-site and off-site storage would require the system administrator to have to learn how to deal with both architectures, which are, inevitably, disparate in their operational procedures.

Historically, space efficient storage systems typically include more local storage than required, or purchased, by a user. In these systems, the unused storage can be unlocked with a remote command, or with a technician, but undesirably increase the cost of the system due to the presence of un-purchased or un-requested memory as well as the additional service costs.

It is therefore a challenge to develop strategies for data storage to overcome these, and other, disadvantages.

SUMMARY OF THE INVENTION

One embodiment of the invention provides a method for storing data that includes establishing a space efficient storage system including a virtual repository, a staging repository and a remote repository. The virtual repository includes a first pointer to the staging repository, and the staging repository includes a second pointer to the remote repository. The method further includes receiving data at the virtual repository, storing the received data in the staging repository based on the first pointer, and transferring the stored data to the remote repository based on the second pointer.

Another embodiment of the present invention is a computer readable medium holding computer readable code for storing data. The medium includes code for establishing a space efficient storage system including a virtual repository, a staging repository and a remote repository. The virtual repository includes a first pointer to the staging repository, and the staging repository includes a second pointer to the remote repository. The medium further includes code for receiving data at the virtual repository, code for storing the received data in the staging repository based on the first pointer, and code for transferring the stored data to the remote repository based on the second pointer.

Yet another embodiment of the invention provides a system for storing data that includes means for establishing a space efficient storage system including a virtual repository, a staging repository and a remote repository. The virtual repository includes a first pointer to the staging repository, and the staging repository includes a second pointer to the remote repository. The system further includes means for receiving data at the virtual repository, means for storing the received data in the staging repository based on the first pointer, and means for transferring the stored data to the remote repository based on the second pointer.

The foregoing embodiment and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

DETAILED DESCRIPTION OF THE PRESENT INVENTION

This invention is a method to extend the idea of space efficient storage to replace the existing repository with a virtual repository that contains a server address and metadata which points to a location on a remote repository. The read/writes from the local machine to the remote machine are based on the frequency of data access. This invention also includes a staging area on the local storage system that holds data recently written by a user, or commonly accessed. The staging area holds the user's recently written data before it has had a chance to be copied asynchronously to the remote storage system. The staging area can be used as a fast caching area that can hold often used data. Increasing the size of the staging area in relation to the virtual repository will, in effect, increase performance at the cost of physical space usage on the local storage system.

Figure 1:
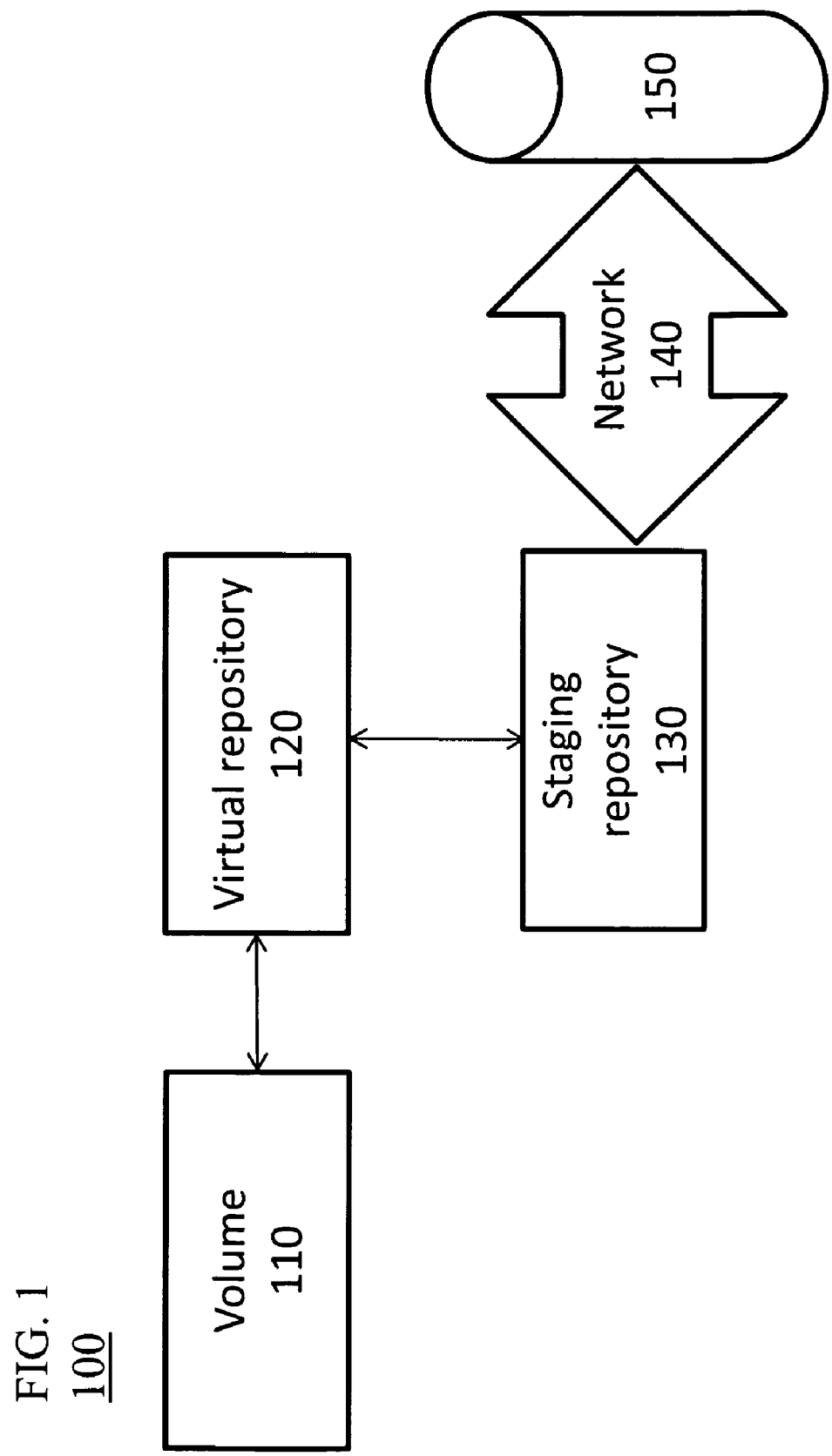
FIG. 1 illustrates one embodiment of a data storage system in accordance with one aspect of the invention.

FIG. 1 illustrates one embodiment of a space efficient storage system 100, in accordance with one aspect of the invention. System 100 includes a space efficient volume 110 in communication with a virtual repository 120. Virtual repository 120 is in communication with staging repository 130. The staging repository 130 is in communication via network 140 with a remote repository 150.

Space efficient repository 110 receives read and write commands from a user computing device that issues read and write commands to a non-volatile memory, such as a personal computer, PDA, laptop, MP3 player or other device. Space efficient repository 110 is a volume that reserves no physical space to hold user data directly. Space efficient repository 110 is a collection of metadata that can point to locations in the local repository, such as the virtual repository 120. If data is written/read to space efficient repository 110, the read/write is rerouted to where the data actually exists on the local system. When an initial write is done to one of the sectors of the space efficient repository 110, an allocation command is sent to the repository to reserve space on the repository so that the user data may be written. There are also commands to release such allocated repository space when it is no longer needed, or when the logical volume is removed.

Virtual repository 120 reserves no physical space on the local storage to hold user data directly. Instead, virtual repository 120 contains metadata for mapping purposes, a reference to the staging repository 130 and a host port World Wide Port Name (WWPN). The host port specified should be connected by network 140, either directly or indirectly, to a remote system which is set up with remote repository 150. The metadata indicates a physical location on a storage system where the user data exists, and a bit which indicates if the user data exists on the local storage system (the assigned staging repository 130) or on the remote repository 150 set up to communicate with this virtual repository 120.

Staging repository 130 holds user data temporarily when the data is either waiting to be copied to remote repository 150, or as a caching area where recently read/written information is stored so that fewer calls to the remote repository 150 are made. Increasing the size of the staging repository 130 in relation to the virtual repository 120, will in effect increase performance at the cost of physical space usage on the local storage system. In one embodiment, the staging repository 130 is sized based on an estimation of bandwidth between the staging repository 130 and the network 140, and anticipated demand for storage throughput. In one embodiment, staging repository 130 includes an area sufficient to store S bytes of data, such that S=F·B, wherein F equals the expected largest file size, and B equals the expected bandwidth to the remote repository. In one embodiment, virtual repository 120 is local to the staging repository 130 and the staging repository 130 is remote to the remote repository 150.

Connection 140 is a network connection providing communication between geographically separated devices. In one embodiment, connection 140 is the Internet. Connection 140 connects remote computing devices, with a user device at one end and the remote repository 150 at the other.

Remote repository 150 holds user data in a persistent, long term manner. Remote repository responds to reads, writes, allocate, and deallocate messages sent from the local server. The physical capacity of the remote repository should be exactly the same as the virtual capacity defined for the virtual repository. In one embodiment, the physical capacity of the remote repository can be adjusted with a command configured to increase and/or decrease storage allocations. In one embodiment, the remote repository includes an area sufficient to store R bytes of data. In one embodiment, $S/R \leq X$, wherein X is a predetermined constant. In one such embodiment, X is less than 0.10. In other embodiments, X is a negligible number such that the total storage in the staging area is a negligible number compared to the total storage in the remote repository. For example, in one embodiment, the staging repository can store 5 gigabytes, whereas the remote repository can store 5 petabytes.

Figure 2:
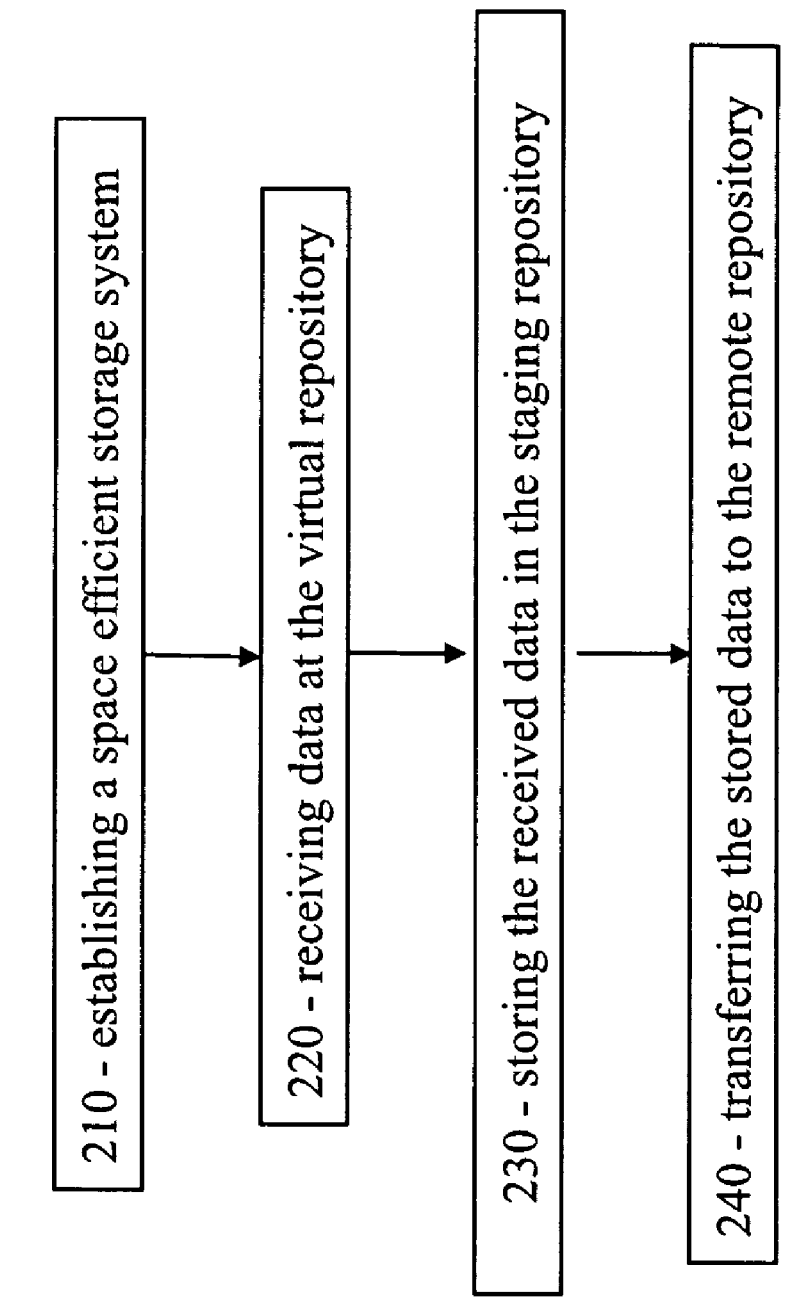
FIG. 2 illustrates one embodiment of a method for storing data in accordance with another aspect of the invention.

FIG. 2 illustrates one embodiment of a method 200 for storing data, in accordance with one aspect of the invention. Method 200 begins at step 210 by establishing a space efficient storage system including a virtual repository, a staging repository and a remote repository. The virtual repository includes a first pointer to the staging repository, and the staging repository includes a second pointer to the remote repository. The virtual repository receives data at step 220, and stores the received data in the staging repository based on the first pointer at step 230. In one embodiment, the virtual repository does not physically store any user data.

The stored data is transferred to the remote repository based on the second pointer at step 240. The transfer is, in one embodiment, synchronous. In other embodiments, the transfer is asynchronous. The synchronous/asynchronous aspect is addressed further below.

In one embodiment, a remote repository command is received and the size of the remote repository is adjusted based on the remote repository command. For example, a service provider can supply customers with remote repository services sized to consumer needs. Thus, the service provider can maintain a zettabyte of storage, for example, comprising volumes of smaller storage units, such as terabytes. A consumer can subscribe for data storage of, for example, 10 terabytes, and based on a request, the storage for that customer can be increased to 15 terabytes or reduced to 5 terabytes. Based on such a request, no on-site visit to the customer local storage would be required, easing the transition.

In one embodiment, the virtual repository and staging repository are disposed at a first location, and the remote repository is geographically offset from the first location. Thus, the storage of data does not require storage at the staging area site, and can be sited to take advantage of real estate costs, service costs, electrical costs, or the like.

When the transfer between the staging repository and remote repository is synchronous, the staging repository can have a substantially reduced volume for storage. In one embodiment using a synchronous data transfer, the staging area has no physical area for persistent data storage. In such an embodiment, the actions affecting the staging repository are solely initiated by an external actor, either a user or the remote repository. When the user initiates a write to the space efficient volume 110, the information is immediately transmitted to the remote repository 150. As with legacy space efficient operation, if the track being written to on space efficient volume 110 has not previous been written to, space is allocated on the fly in the physical remote repository 150. Once the write completes on the remote repository 150, an acknowledgement is sent back to the local storage system along with the physical track location where the data was written in the remote repository 150. This location is recorded in the metadata in the virtual repository 120, and finally, the user process is sent confirmation that the write competed. When the user initiates a read from the space efficient volume 110 the read is redirected to the virtual repository 120, which, in turn, is redirected (along with the known physical location of the user data) to the remote repository 150. The information is then sent back to the local storage system and returned to the user process.

In asynchronous mode, or in embodiments featuring a non-zero sized staging area, any user write requests are initially handled in the staging repository to be transferred to the remote storage system at a later time. While the data exists in the staging repository 130 any reads from the space efficient volume 110 for this information will not need to go over the network. There is a background thread, termed the deferred destage thread, that periodically scans the staging repository 130 and copies any outstanding information to the remote repository 150 in the remote storage system. After the data is copied, the track in the staging repository 130 is marked as available. Any future writes will still read from the staging repository 130 until it is decided by the caching algorithm that this track should be used by new incoming data. Any appropriate caching algorithms can be used, including algorithms based on bandwidth properties, data security properties, time properties, or the like. Whenever the data is no longer valid in the staging area, the virtual repository 120 metadata is updated to point to the valid location in the remote repository 150.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A method for storing data, the method comprising:
    establishing a space efficient storage system including a virtual repository comprising a virtual capacity, a staging repository and a remote repository comprising a physical capacity, wherein:
        the virtual repository includes a first pointer to the staging repository;
        the staging repository includes a second pointer to the remote repository;
        the physical capacity of the remote repository is exactly the same as the virtual capacity of the virtual repository;
        the staging repository is configured to store S bytes of data, such that S=F−B wherein F equals a largest file size and B equals the bandwidth to the remote repository;
    receiving data at the virtual repository;
    storing the received data in the staging repository based on the first pointer; and
    transferring the stored data to the remote repository based on the second pointer.

2. The method of claim 1 wherein the transfer is synchronous.

3. The method of claim 1 wherein the transfer is asynchronous.

4. The method of claim 1 wherein the staging repository includes an area sufficient to store S bytes of data, and wherein the remote repository includes an area sufficient to store R bytes of data, and wherein S/R≦X, wherein X is a predetermined constant.

5. The method of claim 4 wherein X is less than 0.10.

6. The method of claim 1 further comprising:
    receiving a remote repository command; and
    adjusting a size of the remote repository based on the remote repository command.

7. The method of claim 1 wherein the virtual repository receives data from a space efficient volume, the space efficient volume containing no physical space for data storage.

8. The method of claim 1 wherein the virtual repository is local to the staging repository and wherein the staging repository is remote to the remote repository.

9. The method of claim 8 wherein the virtual repository and staging repository are disposed at a first location, and wherein the remote repository is geographically offset from the first location.

10. A computer readable medium including computer readable code for storing data, the medium comprising:
    computer readable code for establishing a space efficient storage system including a virtual repository comprising a virtual capacity, a staging repository and a remote repository comprising a physical capacity, wherein the virtual repository includes a first pointer to the staging repository, and wherein the staging repository includes a second pointer to the remote repository, and wherein the physical capacity of the remote repository is exactly the same as the virtual capacity of the virtual repository, and wherein the staging repository is configured to store S bytes of data, such that S=F−B wherein F equals a largest file size and B equals the bandwidth to the remote repository;
    computer readable code for receiving data at the virtual repository;
    computer readable code for storing the received data in the staging repository based on the first pointer; and
    computer readable code for transferring the stored data to the remote repository based on the second pointer.

11. The medium of claim 10 wherein the transfer is synchronous.

12. The medium of claim 10 wherein the transfer is asynchronous.

13. The medium of claim 10 wherein the staging repository includes an area sufficient to store S bytes of data, and wherein the remote repository includes an area sufficient to store R bytes of data, and wherein S/R≦X, wherein X is a predetermined constant.

14. The medium of claim 13 wherein X is less than 0.10.

15. The medium of claim 10 further comprising:
    computer readable code for receiving a remote repository command; and
    computer readable code for adjusting a size of the remote repository based on the remote repository command.

16. The medium of claim 10 wherein the virtual repository receives data from a space efficient volume, the space efficient volume containing no physical space for data storage.

17. The medium of claim 16 wherein the virtual repository and staging repository are disposed at a first location, and wherein the remote repository is geographically offset from the first location.

18. A system for storing data, the medium comprising:
    means for establishing a space efficient storage system including a virtual repository comprising a virtual capacity, a staging repository and a remote repository comprising a physical capacity, wherein the virtual repository includes a first pointer to the staging repository, and wherein the staging repository includes a second pointer to the remote repository, and wherein the physical capacity of the remote repository is exactly the same as the virtual capacity of the virtual repository, and wherein the staging repository is configured to store S bytes of data, such that S=F−B wherein F equals a largest file size and B equals the bandwidth to the remote repository;
    means for receiving data at the virtual repository;
    means for storing the received data in the staging repository based on the first pointer; and
    means for transferring the stored data to remote repository based on the second pointer.

* * * * *